United States Patent [19]

Miller et al.

[11] 4,325,252
[45] Apr. 20, 1982

[54] POWER MEASURING DEVICE FOR PULSED LASERS

[75] Inventors: Thomas G. Miller, Madison; Billie O. Rogers, Huntsville, both of Ala.

[73] Assignee: The United States of America as represented by the Secretary of the Army, Washington, D.C.

[21] Appl. No.: 155,347

[22] Filed: Jun. 2, 1980

[51] Int. Cl.³ .................. G01K 17/00; G01J 3/42
[52] U.S. Cl. .................. 73/190 EW; 250/338; 356/432
[58] Field of Search .......... 73/190 EW; 250/338, 250/343; 356/216, 432, 433, 437

[56] References Cited

U.S. PATENT DOCUMENTS

| | | | |
|---|---|---|---|
| 3,487,685 | 1/1970 | Shifrin | 73/190 |
| 3,670,570 | 6/1972 | Briones | 73/190 |
| 3,747,401 | 7/1973 | Johnson | 73/190 |

OTHER PUBLICATIONS

Gunn, "Calorimetric Measurements of Laser Energy and Power" in Journal of Physics E: Scientific Instruments, vol. 6, 1973, pp. 103–113.
Shtrikman et al. "Tracer-gas analysis with a resonant optoacoustic cell operating inside of a $CO_2$ laser" in Appl. Phys. Lett. vol. 31, Dec. 1977, pp. 830, 831.
Kerr et al. "Laser Illuminated Absorptivity Spectrophone" in Applied Optics, vol. 7, No. 5, May 1968, pp. 915–922.
Kreuzer "Ultralow Gas Concentration Infrared Absorption Spectroscopy" Journal of Appl. Phys., vol. 42, No. 7, pp. 2934–2943.
Dewey et al. "Acoustic Amplifier for detection of atmospheric pollutants" in Appl. Phys. Lett. vol. 23, No. 11, 12/73, pp. 633–635.
Bruce et al. "In-situ measurements of aerosol absorption with a resonant CW laser spectrophone" in Applied Optics vol. 16, No. 7, 7/77, pp. 1762–1764.

Primary Examiner—Herbert Goldstein
Attorney, Agent, or Firm—Nathan Edelberg; Robert P. Gibson; Harold W. Hilton

[57] ABSTRACT

Apparatus for accurately measuring the power of a pulsed laser without blocking or unduly perturbing the beam. The power of the beam is accurately and reliably measured by measuring the pressure of air which is expanded by heat from the laser beam.

5 Claims, 2 Drawing Figures

POWER MEASURING DEVICE FOR PULSED LASERS

DEDICATORY CLAUSE

The invention described herein may be manufactured, used, and licensed by or for the Government for governmental purposes without the payment to us of any royalties thereon.

BACKGROUND OF THE INVENTION

There is a problem in measuring the power output of laser beams. For example, a highly intense laser beam may over saturate and destroy known energy detectors and power meters with the exception of large heat sink spherical calorimeters which totally blocks the beam. When the beam energy was spread over a large area, the ratio of the area of the beam to the detector area was so large that accurate and reliable power measurements could not be made due to inhomogeneties in the beam.

The device of the present invention accurately and reliably measures the beam power without blocking the beam.

SUMMARY OF THE INVENTION

Apparatus for measuring the power of a laser beam including an open ended tube through which the beam passes to expand air or gases in the tube. A pressure transducer is connected to the tube to give an indication of the pressure of the expanded air or gases in the tube.

BRIEF DESCRIPTION OF THE DRAWING

As seen in FIG. 1, a laser beam power measuring device 10 includes an open ended tube 12 having air in the interior thereof. A transducer 14 is connected to tube 12 and communicates with the interior of the tube. A scope 16 is connected to transducer 14.

The laser beam 18 is passed through tube 12 and heat from the laser beam expands the air in open ended tube 12. The small expansion is picked up via the pressure transducer. Hence, the magnitude of the transducer or the output of the transducer is an indication of laser power.

Figure 1:
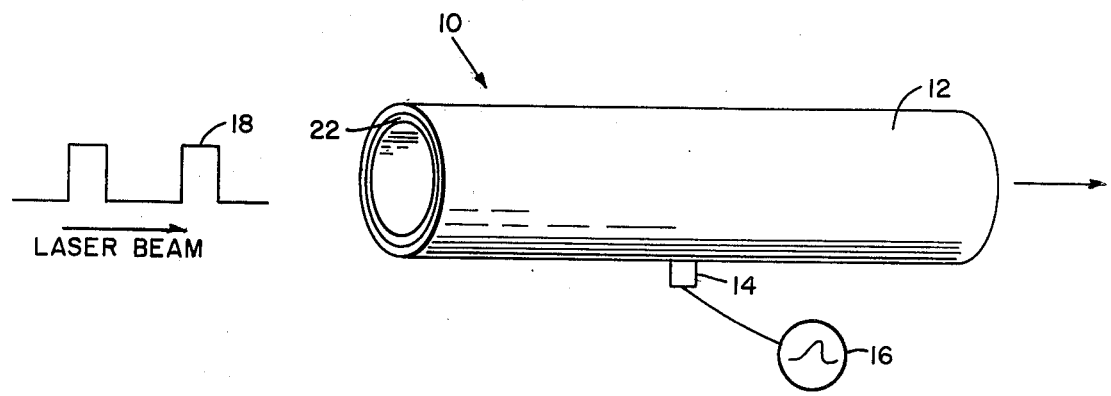
FIG. 1 is a diagrammatic view of the lasers beam power measuring device having air in the interior thereof.
Figure 2:
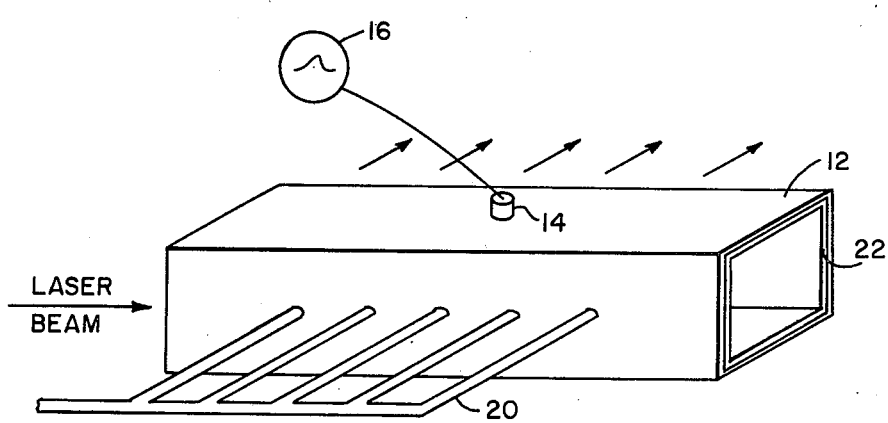
FIG. 2 is a view similar to FIG. 1 using flowing gases in the interior of the device.

If the average power of the laser exceeds a predetermined value it may be desirable to flow the air (or some mixture of gases) through the pipe or cell as shown in FIG. 2. The gases are directed through openings 11 in tube 12 from manifold 20 which is connected to the source of fluid.

The absorption of the gases can be varied by adding one gas with a higher absorption colfficient. For instance, if the power of a repetitively pulsed $CO_2$ laser beam is to be measured, a small amount of $CO_2$ may be added to the flowing gases.

The tubular cell may be of aluminum or stainless steel having insulating material on the inner surface thereof to prevent multiple bounces of sound waves off the surface.

While this instrument is somewhat similar to instruments which measure absorption coefficients knowing the power of the laser, the instrument of the present invention is disposed for measuring power, knowing the absorption coefficients. These instruments usually operate in the milliwatt to watt range, whereas the apparatus of the present invention is disposed to measure power in the kilowatt to megawatt range. To this end apparatus of the present invention uses an open ended tubular cell having flowing gases therein since the higher power lases appreciably raises the temperature of the gases.

Some articles disclosing the use of spectrophones for measuring absorption coefficients in small samples are as follows:

Kerr, E. L. and J. G. Atwood, Appl. Opt., 7,915 (1968)

Kreutzer, L. B., Journal of Appl. Phys 42,2934 (1971)

Dewey, Jr., C. F., and Camm, R. D., and Hacett, C. E., Appl Phys Letters 23,623 (1973)

Bruce, C. W. and Pinnick, R. G., Appl. Optics 16,1762

We claim:

1. Apparatus for measuring the power of a laser beam without blocking the beam comprising:
   (a) an open ended tubular member having an expandible fluid therein;
   (b) measuring means for indicating the magnitude of pressure in said tubular member responsive to expansion of said fluid by heat from a laser beam passed through the length of said tubular member and through said fluid.

2. Apparatus as in claim 1 wherein said measuring means includes a transducer connected into said tubular member and an oscilloscope connected to said transducer.

3. Apparatus as in claim 2 wherein said fluid is air.

4. Apparatus as in claim 2 wherein said fluid is a mixture of gases.

5. Apparatus as in claim 2 including a plurality of openings along the length of said tubular member and a manifold connected to said source of fluid and said openings for directing said fluid into said openings.

* * * * *